United States Patent [19]
Fett et al.

[11] Patent Number: 6,158,789
[45] Date of Patent: *Dec. 12, 2000

[54] ANTI-THEFT PROTECTION DEVICE FOR A MOTOR VEHICLE

[75] Inventors: Robert S. Fett, Westland; Donald J. Ford, Wayne; Donald R. Harding, New Hudson; Trevor R. Bender, Adrian; Sharon Spangler, Dryden, all of Mich.

[73] Assignees: DaimlerChrysler Corporation, Auburn Hills; Cadillac Products, Inc., Troy, both of Mich.

[ * ] Notice: This patent issued on a continued prosecution application filed under 37 CFR 1.53(d), and is subject to the twenty year patent term provisions of 35 U.S.C. 154(a)(2).

[21] Appl. No.: 09/124,488

[22] Filed: Jul. 29, 1998

[51] Int. Cl.[7] .................................................... E05B 17/00
[52] U.S. Cl. .......................... 292/346; 292/1; 296/146.5; 296/146.7
[58] Field of Search ............................... 292/1, 346, 337, 292/169.14, DIG. 51; 49/502; 296/146.5, 39.1, 146.7, 154

[56] References Cited

U.S. PATENT DOCUMENTS

| 4,306,381 | 12/1981 | Presto | 49/502 |
|---|---|---|---|
| 4,628,300 | 12/1986 | Amato | 340/542 |
| 4,917,433 | 4/1990 | Tomforde | 296/146.5 |
| 4,962,601 | 10/1990 | Gold | 49/374 |
| 5,316,364 | 5/1994 | Ohya | 296/146.5 |
| 5,435,609 | 7/1995 | Igata et al. | 292/346 |
| 5,462,482 | 10/1995 | Grimes | 296/146.5 X |
| 5,482,343 | 1/1996 | Bradac | 296/39.1 |
| 5,511,838 | 4/1996 | Baughman et al. | 292/201 X |
| 5,548,930 | 8/1996 | Morando | 296/146.5 X |
| 5,584,144 | 12/1996 | Hisano | 49/502 |
| 5,595,415 | 1/1997 | Beaulat | 296/39.1 |
| 5,632,516 | 5/1997 | Schwab | 292/336.3 |
| 5,676,002 | 10/1997 | Hoeptner, III | 70/416 |
| 5,860,684 | 1/1999 | Mizuki | 292/336.3 |
| 5,904,002 | 5/1999 | Emerling et al. | 49/502 |

FOREIGN PATENT DOCUMENTS

| 823616 | 11/1959 | United Kingdom | 292/1 |

*Primary Examiner*—Teri Pham
*Attorney, Agent, or Firm*—William J. Coughlin

[57] ABSTRACT

An anti-theft protection device for a motor vehicle. In an exemplary application, the anti-theft protection device for a motor vehicle includes a passenger door watershield having a pass-through slit formed therein and an anti-theft sleeve located proximate thereto which encloses and protects the passenger door link rods.

20 Claims, 2 Drawing Sheets

ANTI-THEFT PROTECTION DEVICE FOR A MOTOR VEHICLE

BACKGROUND OF THE INVENTION

1. Technical Field

The present invention generally relates to an anti-theft protection device for motor vehicles. More particularly, the present invention relates to an anti-theft protection device for motor vehicles which is attached to a motor vehicle passenger door watershield and prevents tampering with door lock linkage.

2. Discussion

The general type of motor vehicle door construction with which this invention is concerned typically includes an outer sheet metal panel which defines the door's exterior and an inner sheet metal panel which reinforces the outer panel, and together with the outer panel, defines a chamber. This chamber houses various mechanisms including window operators, door latches, link rods to the door latch, link rods to the door handle, and the like. Openings through the inner door panel allow access to the mechanisms. A trim panel covers the inner door panel and provides the decorative interior for the door. Generally, a semi-rigid plastic watershield or insulator is joined to the inner door panel by means of an adhesive. This semi-rigid plastic watershield closes the various openings found in the inner door panel and prevents water that gets within the interior of the door from wetting the interior surface of the trim panel.

Numerous motor vehicle anti-theft devices are well known in the art. One such commonly known anti-theft device locks the steering column in place, preventing a perpetrator from steering the automobile while in place. Such devices are separate from and not a part of the motor vehicle, thus requiring the user to activate the device prior to departing from the motor vehicle. Additionally, such devices do not prevent damage to the motor vehicle associated with the unsolicited entrance into the motor vehicle by a perpetrator. Alarm type motor vehicle anti-theft devices are normally extremely sensitive and often inappropriately activated by weather conditions such as the wind. This inappropriate activation is so common that the activation of an alarm goes virtually unnoticed and is often ignored. Additionally, such devices also require the user to activate the device. Therefore, it is desirable to have a motor vehicle anti-theft device which prevents the intrusion of a perpetrator, is not commonly inappropriately activated and does not require user activation.

SUMMARY OF THE INVENTION

It is a principal object of the present invention to provide a motor vehicle anti-theft device which prevents the entry into a locked motor vehicle by the use of a "slim jim" device.

It is a more particular object of the present invention to provide a motor vehicle anti-theft device incorporated in a motor vehicle passenger door watershield.

It is another object of the present invention to provide a simple and inexpensive motor vehicle anti-theft device which deflects a slim jim device away from the link rods of a door handle mechanism.

It is an object of the present invention to provide a motor vehicle anti-theft device which does not require user activation.

In one form, the present invention provides a motor vehicle anti-theft device arrangement for preventing the entry into a locked motor vehicle. The anti-theft device arrangement includes a passenger door watershield having an anti-theft sleeve attached thereto which encloses the mechanisms used to open the passenger door.

Additional benefits and advantages of the present invention will become apparent to those skilled in the art to which this invention relates from a reading of the subsequent description of the preferred embodiment and the appended claims, taken in conjunction with the accompanying drawings.

DETAILED DESCRIPTION OF THE PREFERRED EMBODIMENT

Figure 1:
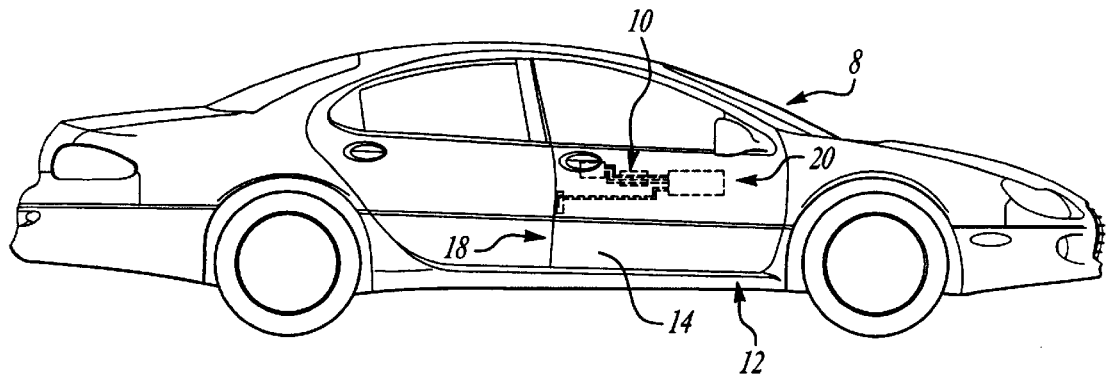
FIG. 1 is an environmental view of a motor vehicle anti-theft device constructed in accordance with the teachings of a preferred embodiment of the present invention and shown operatively installed within a passenger door of a motor vehicle.

Referring now to the drawings, there is depicted an anti-theft device for a motor vehicle embodying the concepts of the present invention. The anti-theft device for a motor vehicle of the present invention is generally identified in the drawings with reference numeral 10 and is shown through the drawings adapted to cooperate with a specific passenger door 12 of a motor vehicle 8. However, it will become apparent below that the teachings of the present invention are more broadly applicable to passenger doors for a large range of motor vehicles.

Figure 2:
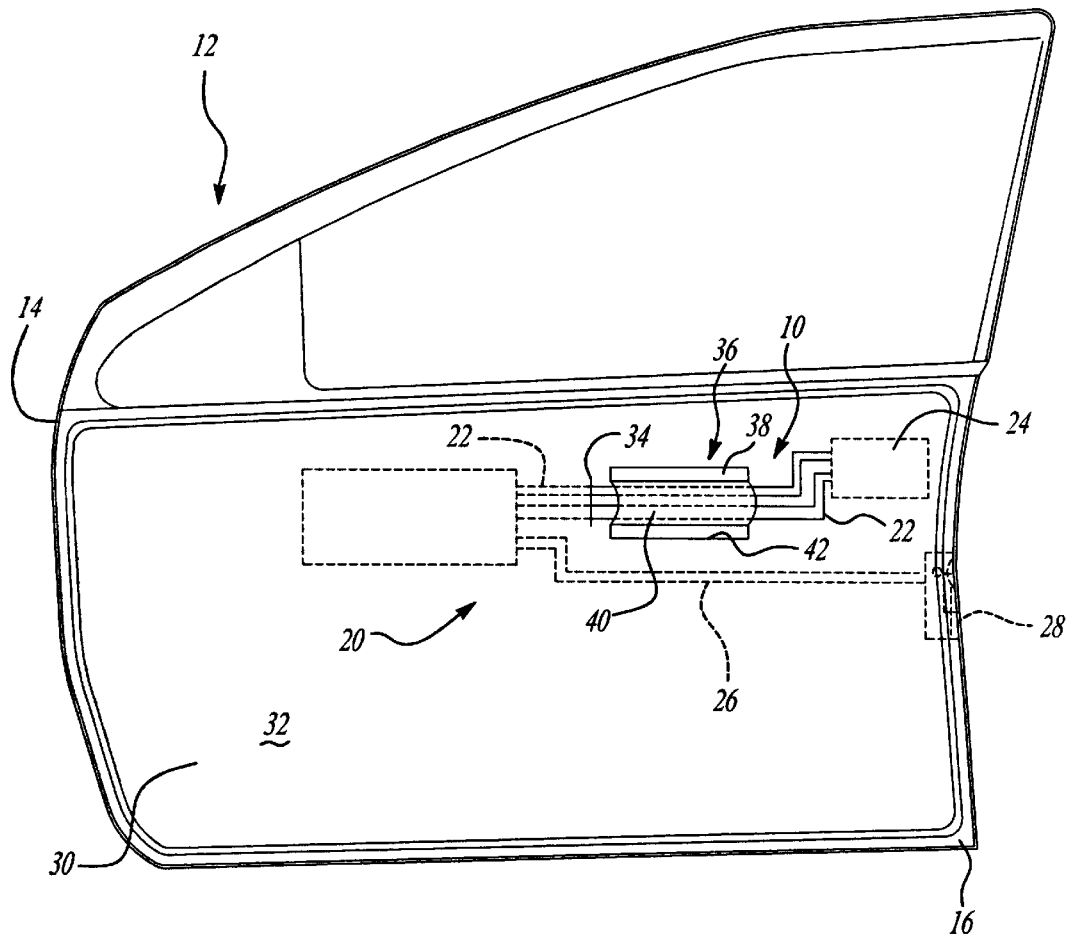
FIG. 2 is an enlarged view of an inboard side of the passenger door of FIG. 1 shown with the inner panel removed for purposes of illustration.

Prior to addressing the construction and operation of the anti-theft device for a motor vehicle 10 of the present invention, a brief understanding of the exemplary passenger door 12 shown in the drawings is warranted. The environmental view of FIG. 1 and FIG. 2 illustrate the anti-theft device for a motor vehicle 10 operatively located in the passenger door 12. The passenger door 12 illustrated is otherwise of conventional construction and shown to generally include an outer sheet metal door panel 14 and an inner sheet metal door panel 16. The outer sheet metal door panel 14 and the inner sheet metal door panel 16 define a chamber 18 which houses various mechanisms including window operators (not shown) and a door opening system 20. The door opening system 20 located in the chamber 18 includes link rods 22 which are operably coupled to a door handle mechanism 24 and link rods 26 which are operably coupled to a door latch mechanism 28. Also included in the chamber 18 is a watershield or insulator 30 which is attached to the inner sheet metal door panel 16 by means of an adhesive or any other suitable attachment means. The watershield 30 includes an inner surface 32 which faces toward the interior of the chamber 18.

Figure 3:
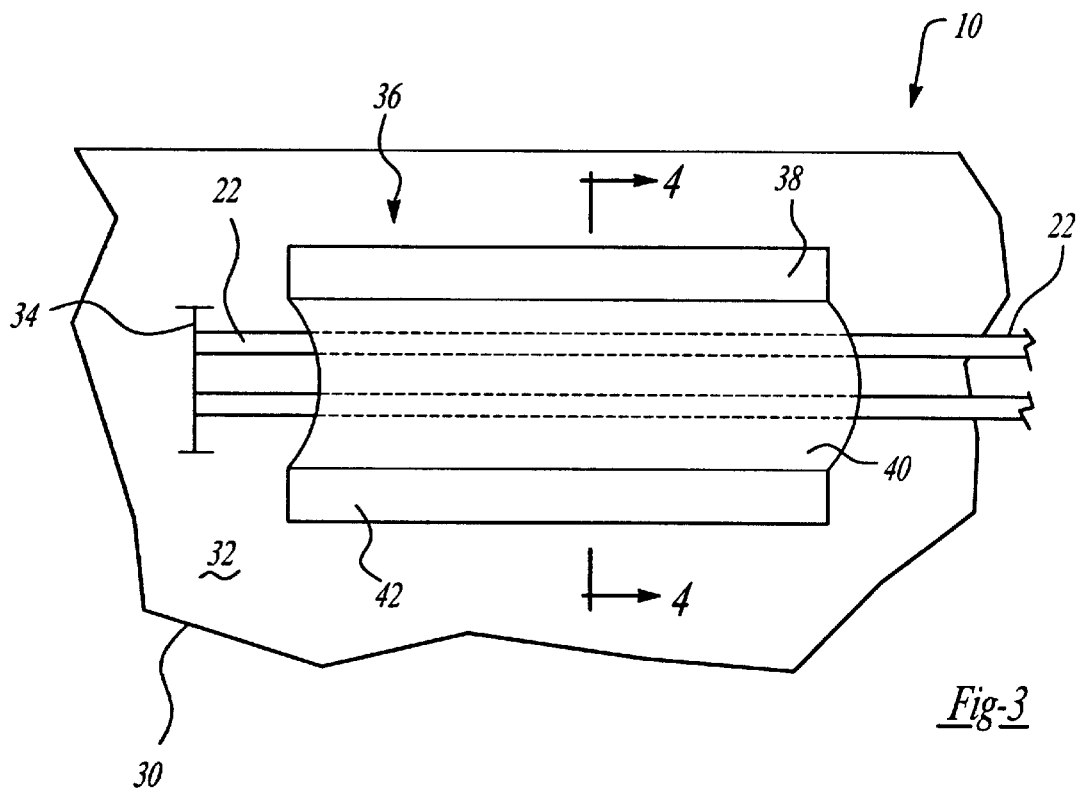
FIG. 3 is an enlarged fragmentary view of a portion of the watershield of FIG. 2 illustrating the device of the present invention in further detail.
Figure 4:
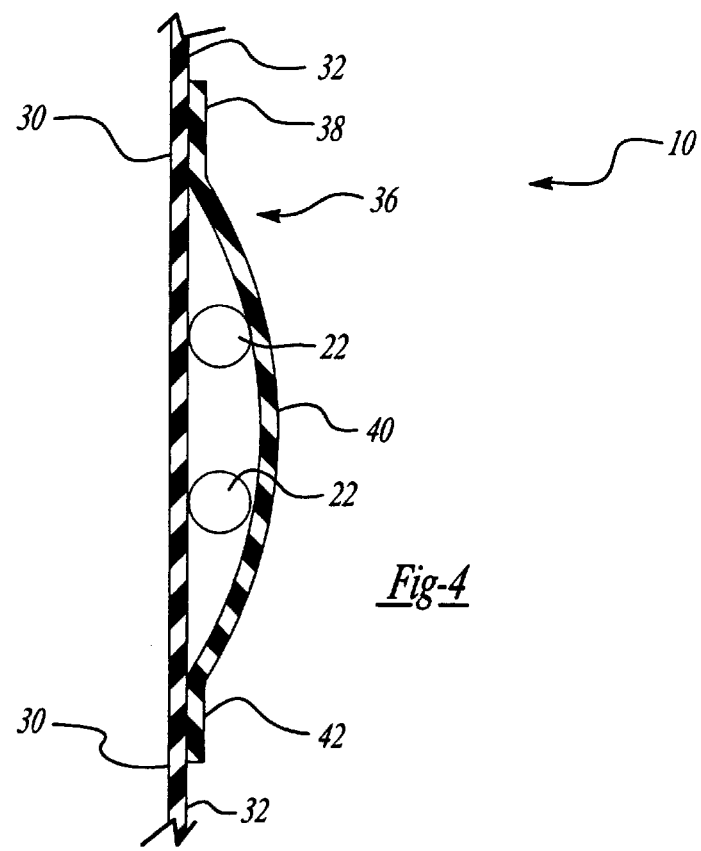
FIG. 4 is a cross-sectional view taken along the line 4—4 of FIG. 3.

With continued reference to FIGS. 2–4, the anti-theft device for a motor vehicle 10 of the preferred embodiment of the present invention will now be further discussed. As shown most clearly in the enlarged views of FIG. 2 and FIG. 3, the anti-theft device for a motor vehicle 10 is located on the inner surface 32 of the watershield 30, between the door handle mechanism 24 and the door latch mechanism 28. The anti-theft device for a motor vehicle 10 is configured generally to the geometry of the watershield 30 and, as most clearly shown in the cross-sectional view of FIG. 4, encloses and covers the link rods 22 of the door opening system 20.

The anti-theft device for a motor vehicle 10 of the present invention is shown to include the watershield 30 having a pass-through slit 34 formed therein and an anti-theft sleeve 36. The anti-theft sleeve 36 is located proximate to the pass-through slit 34 of the watershield 30. The anti-theft sleeve 36 includes a first portion 38, a second portion 40 and a third portion 42. The first portion 38 and the third portion 42 of the anti-theft sleeve 36 are configured generally to the geometry of cooperating portions of the inner surface 32 of the watershield 30 and are attached thereto as most clearly shown in the cross-sectional view of FIG. 4. In the preferred embodiment and in the exemplary embodiment illustrated, the first portion 38 and the third portion 42 of the anti-theft sleeve 36 are heat staked to the inner surface 32 of the watershield 30 as is well known in the art. Other known methods of attachment in the art may equally be applied. The second portion 40 of the anti-theft sleeve 36 is generally arcuate in shape bowing out away from the inner surface 32 of the watershield 30. The anti-theft sleeve 36 can be made of a material similar to the watershield 30 or any other suitable material known in the art.

In the preferred embodiment and the exemplary embodiment illustrated, the link rods 22 which are operatively coupled to the door handle mechanism 24 are fed through the anti-theft sleeve 36 such that the second portion 40 of the anti-theft sleeve 36 encloses and covers the link rods 22 of the door opening system 20. The link rods 22 of the door opening system 20 are then fed through the pass-through slit 34 formed in the watershield 30. Thus, in operation, the anti-theft sleeve 36 covers, encloses and protects the link rods 22 of the door opening system 20 preventing the link rods 22 from being exposed to a slim jim device and causing the slim jim device to be deflected away from the link rods 22 of the door opening system 20.

While the above description constitutes the preferred embodiment of the invention, it will be appreciated that the invention is susceptible to modification, variation, and change without departing from the proper scope or fair meaning of the accompanying claims.

We claim:

1. In a motor vehicle door assembly having a watershield, a door handle mechanism, and a linkage horizontally extending from said door handle mechanism proximate to said watershield, the improvement comprising: an anti-theft mechanism secured to the watershield laterally spaced apart from said door handle mechanism and above the linkage so as to be unattached to said door handle mechanism, said anti-theft mechanism extending downward therefrom so as to at least partially conceal the linkage to prevent tampering with the linkage.

2. The improvement of claim 1, wherein said anti-theft mechanism is heat staked to the watershield.

3. The improvement of claim 1, further comprising a slit provided in the watershield proximate said anti-theft mechanism, the linkage extending through said slit.

4. The improvement of claim 2, wherein said anti-theft mechanism comprises a sleeve operative for enclosing a portion of the linkage.

5. The improvement of claim 4, wherein the linkage is operatively fed through said sleeve and said slit.

6. The improvement of claim 5, wherein said sleeve comprises:

a first portion and a second portion configured generally to a geometry of the watershield; and a third portion disposed between said first portion and said second portion;

whereby said first portion and said second portion are attached to the watershield above and below the linkage, respectively.

7. The improvement of claim 6, wherein said third portion of said sleeve is generally arcuate in shape.

8. A door assembly for a motor vehicle having a body, the door assembly comprising:

a door latch for selectively latching the door to the body;

inner and outer door panels defining a chamber therebetween;

a watershield attached to one of the inner and outer panels;

a door handle attached to one of the inner and outer panels;

linkage means disposed within said chamber and coupled to said door handle for controlling actuation of said door latch; and an anti-theft sleeve attached to said watershield at a location laterally spaced apart from said door handle along said linkage means so as to be unattached to said door latch and positioned so as to at least partially enclose said linkage means;

whereby said anti-theft sleeve prevents tampering with said linkage means.

9. The door assembly of claim 8, wherein said linkage means comprises first link rods and second link rods, said anti-theft sleeve enclosing said first link rods.

10. The door assembly of claim 9, wherein said first and second link rods comprise a pair of horizontally oriented link rods operatively interconnecting said door handle and said door latch.

11. The door assembly of claim 10, further comprising a slit provided in said watershield proximate said anti-theft sleeve, said first link rods being operatively fed through said anti-theft sleeve and said slit formed in said watershield.

12. The door assembly of claim 11, wherein said anti-theft sleeve comprises:

a first portion and a second portion configured generally to a geometry of said watershield; and a third portion disposed between said first portion and said second portion;

whereby said first portion and said second portion are attached to said watershield proximate said slit.

13. The door assembly of claim 12, wherein said third portion of said anti-theft sleeve is generally arcuate in shape.

14. The door assembly of claim 12, wherein said first portion and said second portion of said anti-theft sleeve are heat staked to said watershield.

15. A watershield for a passenger door of a motor vehicle, the passenger door including a latching system having a door handle, a door latch and a latch linkage for selectively controlling the door latch, the watershield comprising:

a main body portion adapted to be attached to the passenger door; and a sleeve attached to the watershield at a location laterally spaced apart from said door handle along said latch linkage so as to be unattached to said door latch and adapted to at least partially conceal the latch linkage.

16. The watershield of claim 15, wherein said sleeve is fixedly attached to said main body portion along a horizontal line and downwardly extends therefrom so as to cover the latch linkage and prevent access to the latch linkage in a downward direction.

17. The watershield of claim 16, further comprising a slit formed in said main body portion proximate said sleeve, said slit adapted to receive the latch linkage.

18. The watershield of claim 17, wherein said sleeve comprises:

a first portion and a second portion configured generally to a geometry of the watershield; and a third portion disposed between said first portion and said second portion;

whereby said first portion and said second portion are attached to said main body portion proximate said slit.

19. The watershield of claim 18, wherein said third portion of said sleeve is generally arcuate in shape.

20. The watershield of claim 18, wherein said first portion and said second portion of said sleeve are heat staked to said main body portion.

* * * * *